(No Model.)
M. KANE.
TENSION DEVICE FOR GRAIN BINDERS.
No. 462,903. Patented Nov. 10, 1891.
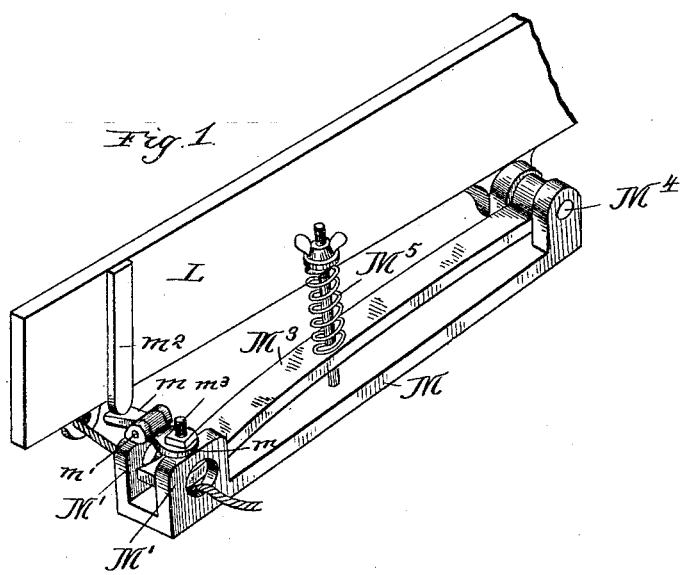
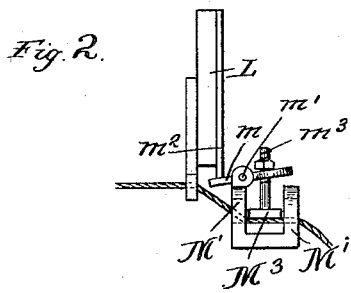
Witnesses:
Inventor:
Maurice Kane

UNITED STATES PATENT OFFICE.

MAURICE KANE, OF CHICAGO, ILLINOIS, ASSIGNOR TO THE WARDER, BUSH-NELL & GLESSNER COMPANY, OF SPRINGFIELD, OHIO.

TENSION DEVICE FOR GRAIN-BINDERS.

SPECIFICATION forming part of Letters Patent No. 462,903, dated November 10, 1891.

Application filed April 1, 1891. Serial No. 387,260. (No model.)

*To all whom it may concern:*

Be it known that I, MAURICE KANE, a citizen of the United States, residing at Chicago, in the county of Cook and State of Illinois, have invented a new and useful Improvement in Tension Devices for Grain - Binders, of which the following is a specification.

This invention relates to a tension device for grain-binders, and its object is to improve the construction of such device.

Like letters of reference are used to designate the same parts in both figures of the drawings, in which—

Figure 1 is a perspective view of the device, and Fig. 2 is an end view of the same.

L designates a part of one of the rear bars of the main frame of a grain-binder, which near one end is provided with a bracket having a lateral extension $M^4$, forming the axis or pivot for the tension-bar M. This tension-bar is preferably provided with a pair of side lugs at each end. The rear pair of lugs form bearings for the pivot or axis, and the forward pair of lugs M' M' guide between them the front end of a follower $M^3$ and have holes in their sides which permit the passage through them of the twine or cord. Upon the inner lug M' is supported a lever, which is pivoted therein by a pivot $m'$. The follower is pivoted on the axis $M^4$ between the rear lugs of the tension-bar, and is normally pressed downward by a spring $M^5$, which encircles a bolt affixed to the tension-bar, but passing through and beyond the follower. The spring is confined between the follower and a nut and washer arranged upon the upper end of the bolt, and its power may be adjusted by such nut. The lever $m$ has a branch extending over the free end of the follower, and from the latter rises a small bolt $m^3$, which passes through the lever and has a head for limiting the upward movement of the lever, which head is preferably in the form of a nut, whereby it is rendered adjustable to accommodate various sizes of twine. The other end of the lever extends beyond the end of the extension-bar in the direction of the machine and passes under a downwardly-projecting lug $M^2$, arranged under the bar L of the frame.

The operation of this tension-bar is as follows: The twine or cord passes through the holes in the front flanges of the tension-bar, under the end of the follower, through a guiding-eye on the frame of the machine, and thence to the knotting mechanism. If the twine is not kept taut, it is liable to be caught by the packer-arms and otherwise be tangled; but when my device is used if the twine gets slack the free end of the pivoted tension device drops on account of gravity and takes up slack. Sometimes it happens that there is a knot or an otherwise unusually thick portion in the twine, and if my device made no provision for this too great a strain upon the twine would result; but this difficulty has been avoided by my tension device, for when a knot or other thickness offers an obstruction to the free passage of the twine the free end of the tension device is lifted by the pull on such twine until the arm or branch $m$ of the lever strikes the lug $m^2$ on the frame, when the arm $m$ is depressed and through its outer end lifts the free end of the spring-actuated follower, thus permitting the obstruction to pass. Of course the degree to which the free end of the follower is lifted corresponds with the size of the obstruction, and thus perfect equalization is maintained.

The above description covers the preferred form; but it is obvious to those skilled in the art that there may be many changes in the details without departing from the spirit of my invention.

What I claim as new, and desire to secure by Letters Patent of the United States, is—

1. In a tension device for grain-binders, the combination of a bar pivoted at one end to the frame by an axis approximately parallel with the path of the twine, the length of such bar being transverse to such path, and a spring-pressed follower operating against the free end of said bar, substantially as and for the purpose set forth.

2. In a tension device for grain-binders, the combination of a bar pivoted at one end to the frame by a horizontal axis substantially parallel with the path of the twine and having its other end free and provided with flanges projecting beyond the face of such bar and containing lateral apertures through which the twine may pass, and a spring-pressed follower operating against the said bar, substantially as and for the purpose set forth.

3. In a grain-binder, a tension device consisting of a bar pivoted to the frame at one end, a spring-actuated follower operating upon such bar, between which parts the twine passes, and a short lever pivoted to a free end of the bar and having one of its ends connected to the follower and its other end projected under a lug on the main frame, substantially as and for the purpose set forth.

4. In a grain-binder, a tension device consisting of a bar pivoted at one end to the frame, having its free end provided with side flanges containing holes through which the twine may pass, a spring-actuated follower pivoted at one end upon the pivot of the bar and having its other end resting on the free end of such bar, and a short lever pivoted to one of the flanges on the bar and having one of its arms connected with the free end of the follower and its other end projected under a lug on the main frame, substantially as and for the purpose set forth.

In testimony whereof I have hereunto set my hand in the presence of two witnesses.

MAURICE KANE.

Witnesses:
 JAMES L. GERRY,
 ANDREW STARK.